United States Patent
Kleindienst et al.

(10) Patent No.: US 9,516,155 B2
(45) Date of Patent: Dec. 6, 2016

(54) MULTI-MODAL MESSAGING

(75) Inventors: Jan Kleindienst, Nove Straseci (CZ);
Martin Labsky, Prague (CZ);
Stephane H. Maes, Danbury, CT (US);
Jan Sedivy, Hartsdale, NY (US)

(73) Assignee: Nuance Communications, Inc., Burlington, MA (US)

(*) Notice: Subject to any disclaimer, the term of this patent is extended or adjusted under 35 U.S.C. 154(b) by 1740 days.

(21) Appl. No.: 11/968,467

(22) Filed: Jan. 2, 2008

(65) Prior Publication Data

US 2008/0152095 A1 Jun. 26, 2008

Related U.S. Application Data

(62) Division of application No. 10/386,247, filed on Mar. 11, 2003, now Pat. No. 7,315,613.

(60) Provisional application No. 60/363,668, filed on Mar. 11, 2002.

(51) Int. Cl.
*H04M 1/725* (2006.01)
*G10L 15/26* (2006.01)

(52) U.S. Cl.
CPC .......... *H04M 1/72561* (2013.01); *G10L 15/26* (2013.01); *H04M 1/72547* (2013.01); *H04M 2250/74* (2013.01); *Y10S 707/99933* (2013.01)

(58) Field of Classification Search
CPC ................................. H04M 1/72552
USPC ........................................ 455/412
See application file for complete search history.

(56) References Cited

U.S. PATENT DOCUMENTS 5,705,995 A * 1/1998 Laflin ............... G08B 5/227 340/4.5
6,069,939 A 5/2000 Fung et al.
6,384,827 B1 * 5/2002 Dawkins ............... 345/467
6,704,396 B2 3/2004 Parolkar et al.
6,724,864 B1 4/2004 Denenberg et al.
6,738,975 B1 * 5/2004 Yee et al. ............... 719/310
6,789,064 B2 9/2004 Koh
7,107,268 B1 * 9/2006 Zawadzki et al.
7,130,807 B1 * 10/2006 Mikurak ............... 705/7.25
7,315,613 B2 1/2008 Kleindienst et al.
7,876,783 B2 * 1/2011 Kim ............... 370/473
8,050,695 B2 * 11/2011 Bells ............... 455/466
2001/0006889 A1 * 7/2001 Kraft ............... H04M 1/72552 455/412.1
2002/0198810 A1 * 12/2002 Roger ............... 705/36
2003/0018622 A1 1/2003 Chau
2003/0060240 A1 * 3/2003 Graham ............... G06Q 10/107 455/566
2003/0078033 A1 * 4/2003 Sauer ............... 455/412
2003/0182622 A1 9/2003 Sibal et al.

* cited by examiner

*Primary Examiner* — Jerry Dennison
(74) *Attorney, Agent, or Firm* — Wolf, Greenfield & Sacks, P.C.

(57) ABSTRACT

Systems and methods for multi-modal messaging that enable a user to compose, send and retrieve messages, such as SMS, MMS, IM or ordinary e-mail messages, for example, using one or more I/O (input/output) modalities (e.g., speech I/O and/or GUI I/O). A method for composing messages combines the advantages of a multi-modal interface (e.g., grammar-based speech and touchscreen or similar input devices) and message templates, which allows a user to construct a message with significantly less effort in a fraction of the time required by conventional methods. The user can dictate his/her messages using speech and/or GUI input, for example, based on a library of message templates which can be personalized by the user to fit his/her social interaction needs.

18 Claims, 5 Drawing Sheets

MULTI-MODAL MESSAGING

CROSS REFERENCE TO RELATED APPLICATIONS

This is a Divisional Application of, and claims priority under 35 U.S.C. §120 to, U.S. patent application Ser. No. 10/386,247, filed Mar. 11, 2003, now U.S. Pat. No. 7,315,613, issued Jan. 1, 2008, which application claims priority under 35 U.S.C. §119 to U.S. Provisional Application No. 60/363,668, filed on Mar. 11, 2002, the disclosures of which are herein incorporated by reference in their entirety.

TECHNICAL FIELD OF THE INVENTION

The present invention relates generally to systems and methods for multi-modal messaging. In particular, the invention relates to systems and methods for multi-modal messaging that employ a multi-modal user interface which enables a user to generate and retrieve messages, such as SMS (Short Message Service) messages, using one or more modalities (e.g., speech and/or GUI).

BACKGROUND

Traditionally, wireless communication services have included voice cellular phone services and paging services in which a user can make a telephone call or send/receive a page including a numeric message indicating a telephone number over a wireless network. More recently, paging services have been expanded to offer alphanumeric paging, which allows a short text-based message to be sent to a handheld pager and displayed on such pager. Both cellular telephone and paging services, however, require an intended subscriber to be on-line or active to receive a telephone call or receive a transmitted paging message and such services do not typically offer the capability of storing the messages for a subscriber that is temporarily unavailable.

Due to the increasing popularity of digital wireless technology, the GSM (Global System for Mobile) communications protocol for digital wireless networks was introduced in Europe in the early 1990's, which included a messaging service known as SMS (Short Messaging Service). SMS is a wireless service that enables the transmission of alphanumeric messages between mobile subscribers and external systems such as electronic mail, paging and voice mail systems. SMS allows mobile phone users to write short text messages (e.g., up to 160 characters) using the phone keyboard and send such messages to other users for a relatively small service charge. Short message services are advantageous over text based paging services because of the capability of bi-directional communication. Such bi-directional communication allows, for example, notification to the originating device of the success or failure of the short message delivery.

Traditionally, the SMS service was available to mobile phones that use GSM communication, which is primarily available and popular in Europe and Asia. SMS is gaining popularity in the United States and is currently implemented using digital wireless/mobile networks, such as a PCS network based on the GSM standard, code division multiple access (CDMA) and/or time division multiple access (TDMA) methods.

The traditional input method for writing SMS messages is using a phone keyboard. There are various disadvantages associated with keyboard entry input. For instance, such input method is tedious and time consuming because the user has to make up to 3 to 4 keystrokes to type a single character. Consequently, a simple message such as "I'll be 20 mins late" can take 30 seconds to write. Some phone vendors somewhat alleviate this problem by providing a word auto-completion feature, such as the T9 feature Nokia phones. Other disadvantages of typing messages manually include having to use small keyboards that are provided with small mobile devices, which are cumbersome to use, as well as the concomitant careful viewing of a small screen required on the part of the user.

These disadvantages can be partially offset by conventional text templates that are provided with mobile phones. Although such templates might eliminate part of the typing task, there are also disadvantages associated with such text templates. For example, there is typically a limited amount of different templates that are provided with such devices and text templates typically cannot be added or edited. Furthermore, the use of text templates can be tedious and burdensome because the user has to manually navigate through a menu containing the templates and the user must manually type in the blanks. Another disadvantage with conventional text templates is that although a user can fill in the blanks, the user cannot edit the final message before sending such message.

There are other currently available messaging systems such as MMS (multi-media services) (for sending photos and other multi-media items) and mobile IM or IMS (instant messaging services), but such systems and services have not been as fully developed as SMS. Although there is a large market for carrier and service providers (operators) of services such as SMS, MMS, IM or IMS, for example, such services are mostly limited by costs and user interface (keypad entry). Therefore, it will be appreciated that a need exists in the prior art to address cost and user interface concerns so that messaging systems such as SMS, MMS and mobile IM can reach their full potential.

SUMMARY OF THE INVENTION

The present invention is generally directed to systems and methods for multi-modal messaging that enable a user to compose, send and retrieve messages, such as SMS, MMS, IM or ordinary e-mail messages, for example, using one or more I/O (input/output) modalities (e.g., speech I/O and/or GUI I/O). More specifically, a method for composing messages according to one aspect of the invention combines the advantages of a multi-modal interface (e.g., grammar-based speech and touchscreen or similar input devices) and message templates, which allows a user to construct a message with significantly less effort in a fraction of the time required by the conventional methods. The user can dictate his/her messages using speech and/or GUI input, for example, based on a library of message templates which can be personalized by the user to fit his/her social interaction needs.

In one aspect of the invention, a method for providing multi-modal messaging comprises receiving user input through a multi-modal user interface, composing a message responsive to the user input using one or more message templates, and forwarding the message to a target recipient using a messaging protocol. Preferably, the multi-modal user input comprises speech input that is recognized using automatic speech recognition. Automatic speech recognition can be grammar based or prompted, for example.

In another aspect of the invention, the method comprises maintaining a library of message templates that can be accessed by the user to edit a predefined message template or generate a new message template. The message templates are grouped into one or more categories or subcategories, wherein each category and subcategory comprises one or more keywords, each keyword being associated with a text string that is used to compose a message. Message composition is preferably performed by selecting one or more categories, subcategories, and keywords in response to the user input to select a text string. A text string may comprise a field that is associated with a grammar which is used to fill the field based on speech input from the user.

In another aspect of the invention, a user can select one or various message formats (mobile, e-mail, etc.) for sending a composed message.

In yet another aspect of the invention, a message can be translated to a language of a target recipient. Such translation may be performed by selecting the target recipient from an address book and translating the message to the language associated with the recipient as pre-specified in the address book.

In another aspect of the invention, a method for authoring message templates for use with a messaging system comprises defining a category that is associated with one or more related template messages, defining a keyword for each template message associated with the category, wherein each keyword is a unique identifier for the associated template message, and specifying one or more properties associated with the category. Such properties include, for example, an identification property that is used for logically associating the category with the same category in a different language. The properties further comprise, for example, a language property that specifies a language of subcategories and templates associated with the category, a name property which is used to represent the category visually on a display or which is used for recognizing spoken input, and an icon property that specifies a name of an image file that can be used to visually represent the category.

These and other aspects, features, and advantages of the present invention will become apparent from the following detailed description of the preferred embodiments, which is to be read in connection with the accompanying drawings.

DETAILED DESCRIPTION OF PREFERRED EMBODIMENTS OF THE INVENTION

Figure 1:
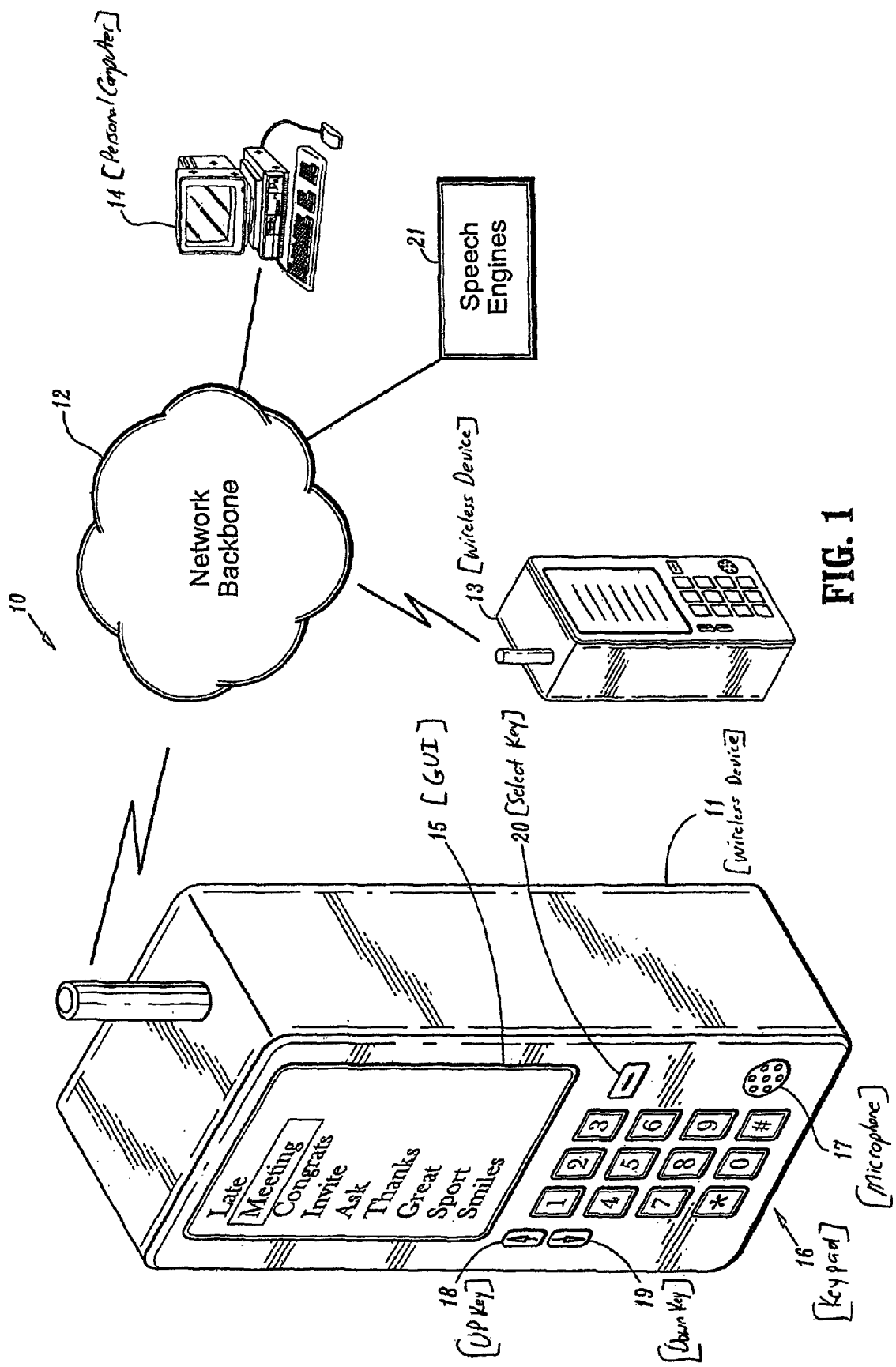
FIG. 1 illustrates a messaging system according to an embodiment of the present invention.

The present invention is generally directed to systems and methods for multi-modal messaging that enable a user to compose, send and retrieve messages, such as SMS, MMS, IM or ordinary e-mail messages, for example, using one or more I/O (input/output) modalities (e.g., speech I/O and/or GUI I/O). More specifically, a method for composing messages according to one aspect of the invention combines the advantages of a multi-modal interface (e.g., grammar-based speech and touchscreen or similar input devices) and message templates, which allows a user to construct a message with significantly less effort in a fraction of the time required by conventional methods. The user can dictate his/her messages using speech and/or GUI input, for example, based on a library of message templates (such as 'I'll be <num> mins late', or 'Let's go play <sport> on <day>') which can be personalized by the user to fit his/her social interaction needs. The invention provides an extension to current SMS messaging, for example, where a particular simplified syntax and keyboard input is used to compose messages. To that end, the present invention advantageously enables multi-modal message composition and use of predefined message templates that drive most of the messages and limit the grammars and vocabulary associated with the speech input for selecting and filling message templates.

In a preferred embodiment of the invention, a multi-modal interface is preferably implemented using a multi-modal (MM) browser that executes in a conventional cellular phone, a "smart" cellular phone (e.g., one with web browser or other Internet capability) or a wireless personal digital assistant (PDA). Multi-modal messaging systems and methods of the invention are believed to have their greatest benefit with the foregoing types of devices, since such devices typically do not have a full size keyboard. Indeed, wireless devices, which lack conventional full keyboards (such as QWERTY keyboards) and which currently using the 2.5 Ghz and 3 Ghz frequencies, can especially benefit greatly from the present invention. However, it is to be appreciated that multi-modal messaging systems and methods according to the invention may be used with wireless terminals, portable computers with a wireless connection to the Internet, or indeed, any type of mobile device (or fixed device without conventional I/O means).

It is to be understood that the systems and methods described herein may be implemented in various forms of hardware, software, firmware, special purpose processors, or a combination thereof. In particular, the present invention is preferably implemented as an application comprising program instructions that are tangibly embodied on a program storage device (e.g., magnetic floppy disk, RAM, ROM, CD ROM, FLASH memory, etc.) and executable by any device or machine comprising suitable architecture. It is to be further understood that because some of the constituent system components and process steps depicted in the accompanying Figures are preferably implemented in software, the actual connections between such components and steps may differ depending upon the manner in which the application is programmed. Given the teachings herein, one of ordinary skill in the related art will be able to contemplate these and similar implementations or configurations of the present invention.

FIG. 1 is a diagram illustrating a messaging system according to an embodiment of the invention. The system (10) comprises a wireless device (11) that communicates wirelessly with a communications network (12). The wireless device (11) may comprise a mobile telephone or smart phone such as shown in FIG. 1, but it is to be understood that any PDA (personal digital assistant) or mobile device with wireless communication ability, for example, may be used. The communications network (12) can be configured for wireless communication with other wireless devices such as device (13), which can be similar to, or different from, wireless device (11). In addition, the network (12) can interface with other devices such as a conventional PC (personal computer) (14) via a "hard-wired" connection. It is to be understood that the network (12) may comprise network infrastructure for supporting various types of networks. For instance, the network (12) may comprise, for example, one or more cellular networks interfacing with a PSTN (public switched telephone network). In addition, the network (12) comprises the necessary messaging service centers, application servers, gateways, switching centers, other conventional infrastructure, etc., that enables management and transmission of messages to and from the various devices (11, 13 and 14).

In general, the wireless device (11) comprises a GUI (graphical user interface) screen (15) and a conventional telephone keypad (16). The device (11) further comprises a microphone (17) for receiving speech input, an "up" key (18) and "down" key (19) for scrolling through items/text that are displayed on the GUI screen (15), and a select key (20) for selecting a highlighted screen entry (e.g., the entry "Meeting" as shown), although such selection may be performed via voice in accordance with the present invention. It is to be understood that the details of device (11) are exemplary and that other device configurations or components for providing similar functionalities are contemplated by the present invention.

In one preferred embodiment of the invention, the devices (11, 13 and 14) comprise a speech input device (such as microphone) together with a screen, such as GUI screen, or other display, for enabling multi-modal input. Other modalities such as a touchscreen, stylus, keypad, etc., may be implemented. As noted above, a keyboard could also be used, but the present invention is believed most beneficial for applications where a conventional keyboard is not available due to space or other restrictions.

In one preferred embodiment, the speech input modality is implemented using grammar-based ASR (automatic speech recognition). It is to be understood that depending on the processing capabilities and available resources of the device used, ASR can be performed by the device (e.g., device 11) (fat client configuration), or ASR can be performed remotely by a speech server (21) in a client-server architecture (thin client configuration). The speech server (21) may comprise a plurality of speech engines, for example, a speech recognition engine for recognizing spoken utterances and a TTS (text-to-speech synthesis) engine for generating voice synthesized prompts or audio playback of text messages. For remote processing, speech input can be shipped by the device (11) to the speech server (21) over the network (12) and the processing results are shipped back to the device (11) using suitable communication protocols. In another embodiment, speech processing may be distributed between the device (11) and the speech server (21).

It is to be appreciated that various protocols may be used for streaming speech/audio data and exchanging control messages over network (12) to perform speech/audio processing. In one preferred embodiment, the implementation of a distributed system is based, in part, on conversational coding, transport and control protocols described, for example, in U.S. patent application Ser. No. 10/104,925, filed on Mar. 21, 2002, entitled "Conversational Networking Via Transport, Coding and Control Conversational Protocols," which is commonly assigned and fully incorporated herein by reference. Briefly, this application describes novel real time streaming protocols for DSR (distributed speech recognition) applications, and protocols for real time exchange of control information between distributed devices/applications.

Figure 2:
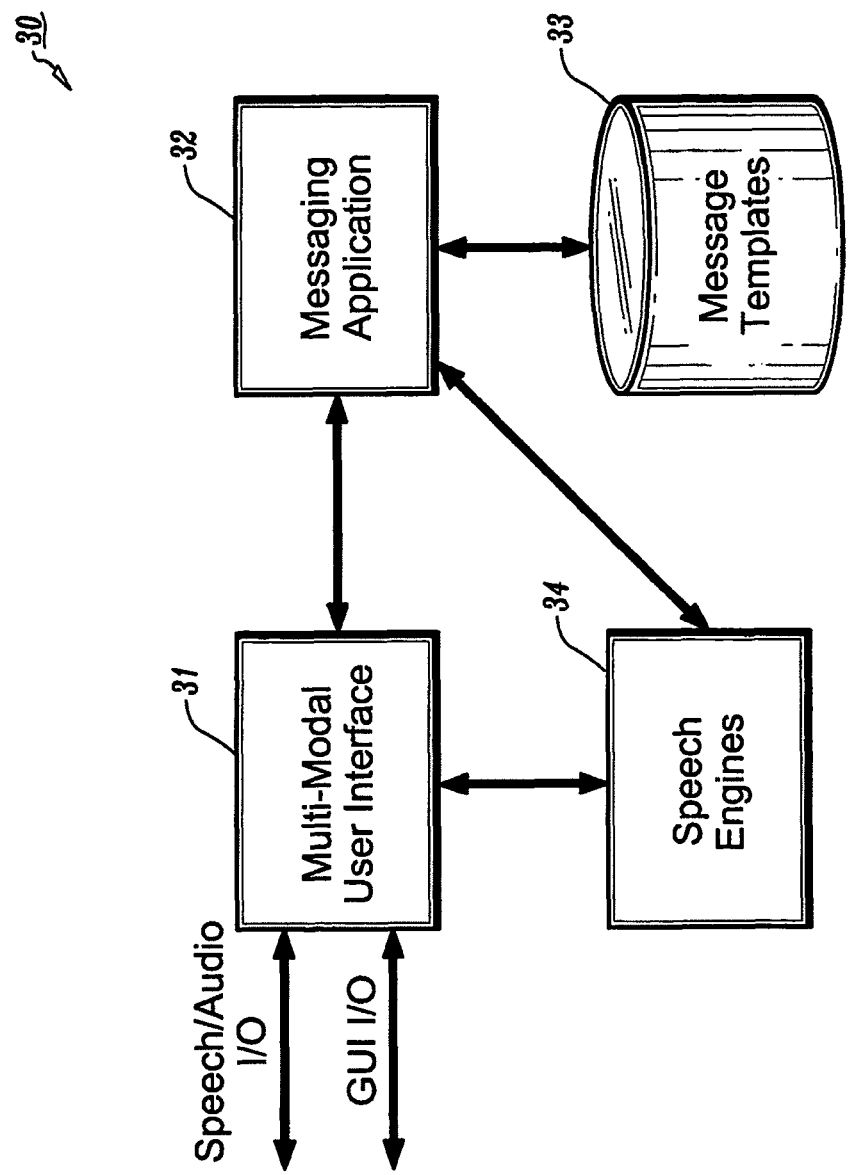
FIG. 2 is a block diagram illustrating a system for composing messages according to an embodiment of the invention.

FIG. 2 is a block diagram illustrating a multi-modal messaging system according to an embodiment of the invention. In particular, FIG. 2 illustrates various software components (modules) of a multi-modal messaging system that may be implemented in the device (11) of FIG. 1, for example, although it is to be understood that such components can be distributed over the network (12). In general, the system (30) comprises a multi-modal interface (31), a messaging service application (32), a database (library) of message templates (33) and one or more speech engines (34) (e.g., ASR engine, TTS engine, etc.) The system (30) may further comprise a dialog manager to drive the interaction with the user.

In a preferred embodiment, the multi-modal user interface (31) comprises a multi-modal browser that provides user interaction through a synchronized voice and GUI interface. In the exemplary embodiment, the multi-modal interface (31) supports both GUI I/O and speech/audio I/O, although other modalities may be supported. Various embodiments for implementing a multi-modal interface will be described below. Preferably, the multi-modal user interface (31) provides the capability for the user to readily switch between various modalities at any time and seamlessly continue the transaction depending on the authoring method (multiple authoring, single authorizing) of the messaging application (32) and the level of synchronization granularity supported by such application. Preferably, the multi-modal interface (31) minimizes the risk of inconsistent user interfaces by guaranteeing that the different views (GUI, speech) are always in a same or consistent state within the limits of the supported level of synchronization granularity. In other embodiments, implementation of the user interface can be sequential or in voice-only mode (however, these latter options are considered to be less desirable).

In response to multi-modal user input, the messaging application (32) composes a message using one or more message templates in database (33) and then forwards the message using a suitable messaging protocol for subsequent transmission to a target device. The multi-modal user input can specify a message to be delivered (e.g., SMS, e-mail, etc.). The multi-modal user input can include speech input that is processed (ASR) by the speech engines (34) to recognize the spoken input. In addition, the messaging application (32) can access speech engines (34) to generate voice synthesized prompts. As noted above, speech engines (34) may be local or remote (via client-server) and may use pre-loaded grammars. In addition, access to the messaging application (e.g., SMS) may be local or remote (messaging application (32) and/or templates (33) located on a remote server). Various fat-client and thin-client architectures and frameworks for implementing the multi-modal messaging system (30) can be readily envisioned by one of ordinary skill in the art.

As noted above, the message template library (33) comprises a plurality of predefined message templates that enable the messaging application (32) to generate messages (e.g., SMS messages) based on the user input. In a preferred embodiment, the templates are organized/grouped into various predefined categories, wherein each "category" (or subcategory) comprises one or more predefined "keywords" that can be selected (via voice or GUI) to compose a message. In particular, each "keyword" is associated with a predefined "text" string that comprises a predefined message. Each "text" string may comprise either none, or one or more fields that are associated with grammars which are used to fill the fields via voice input.

By way of example, the following Table 1 sets forth an exemplary set of message templates (in English) which may be stored in the database (33) of message templates.

TABLE 1

| category | keyword | text |
| --- | --- | --- |
| Late | sorry | Sorry, I will be <number> minutes late |
| | excuse me | Please excuse me, I am going to be <number> |
| | traffic | Sorry, I got stuck in the traffic. I will be <number> minutes late. |
| | right to | Sorry, I will be <number> minutes late, so I will come right to <funplace> |
| Meeting -> Arrange | friendly | Hi people, there is a meeting at <time>. |
| | polite | I would like to arrange a meeting at <time>. |
| Meeting -> Postpone | friendly | The meeting at <time> is postponed to <time>. |
| | polite | I am sorry I have to postpone the meeting to <time>. |
| Meeting -> Cancel | friendly | The meeting at <time> is canceled. |
| | polite | I am sorry I have to cancel the meeting at <time>. |
| Gratulate | let me | Let me congratulate you to your <event>. |
| | birthday | Congratulations! Happy birthday, dear <friend>! |
| Invite | I would like | I would like to invite you to <funplace>. |
| | let me | Let me invite you to <funplace>. |
| | let's go to | Let's go to <funplace><on day><at time>. |
| | let's go for | Let's go to <food><on day><at time>. |
| | instead | Instead of going to <funplace> let's go <sport>. |
| | make a party | Let's make a party <on day>! |
| | party | We are having a party <on day> from <time>. Wanna come? |
| Ask | desperate | I desperately need |
| | favor | Would you do me a favor? I need |
| | would you | Would you please? |
| | directions | How do I get to <funplace>. |
| | where | When and where do we meet? |
| Thanks | very much | Thank you very much. |
| | I would like | I would like to thank you very much. I really appreciate your help. |
| | thanks | Thanks! You helped me a lot. |
| | saved | You saved me! thanks. |
| Greet | how are you | Hi! How are you doing? |
| | hey | Hey, what are you up to? Are you free? |
| Sport | let's go | Let's go <sport><on day>. |
| | we are going to | <on day> we are going to <sport> from <time>. Wanna come? |
| | come to | Come to <sportplace> to <sport>. There will be <friends>. |
| Smilies | cool stuff | <pictures1> |
| | food | <pictures2> |
| | faces | <pictures3> |

Furthermore, the following Table 2 provides an exemplary set of grammars (in English) which may be used in connection with the message templates.

TABLE 2

| name | what can be understood |
| --- | --- |
| time, number, date, currency, phone ... | any appropriate pre-defined or user grammars can be employed, for example, Euro, dollars, pounds for currency; country code, area code, local phone number for phone, etc. |
| day | today, tomorrow, yesterday, on Monday, on Tuesday, on Wednesday, on Thursday, on Friday, on Saturday, on Sunday |

TABLE 2-continued

| name | what can be understood |
| --- | --- |
| sport1 | running, swimming, playing football, playing tennis, skating |
| sport2 | run, swim, play football, play tennis, ski |
| food | pizza, meal, dinner, lunch, beer, shot |
| funplace | cinema, pub, restaurant, theater, Barney's, Big John's |
| event | birthday, success, victory, promotion |
| sportplace | school, playground, park, outside |
| friends | Martin, Joe, Peter, Paul, Jane, Mary |
| cool smilies | idea, car, biker, sorry, shark |
| feeling smilies | kiss, headache, heart, yes, no |
| food smilies | cake, dinner |

It is to be appreciated that a user can localize the messaging application by, e.g., selecting a default language and by authoring his/her own message templates (e.g., SMS templates). Preferably, all data associated with the message templates (33) is contained in a particular file in the main directory of the application. In the following discussion, it is assumed that the templates are authored using XML (eXtensible Markup Language), which is well known in the art, and the messaging application is an SMS application. For example, using XML, the file that contains the message template data can be named "structure.xml". The user can add, delete or edit any category, template or grammar in the XML file using any text editor. For viewing in color, a browser such as MS Internet Explorer can be used.

The document's root tag is preferably of a predetermined type, e.g., <txml> (denoting template XML). The document should contain one <sms> tag, for example, which can contain multiple <category> tags. By way of example, 9 category tags is optimal to fit screens of current palmtop devices.

Preferably, each category tag has an id (identification), lang (language), name and icon property specified. The id property is used to match together different language versions of the same category and provides a mechanism for translating messages between languages (as described below). For the translation to work, the id property should be kept identical for categories having identical meanings. The value of the name property can represent the category visually and also can be used for speech recognition. The lang property can specify the language of all subcategories and templates that are contained within the category. If the lang property value is omitted, the category is considered multilingual and such category can contain subcategories of different languages. The value of icon should be the name of a bitmap (.bmp) file representing the particular category. Preferably, the bitmap file is located in specified directory such as an "img" directory.

As noted above, a <category> tag can contain either subcategories or templates (typically not both). A <template> tag should have a property named "keyword", which uniquely identifies the template within its category. The character data of a template can define the text of the template and can be interrupted by zero or more <fill> tags.

A <fill> tag should have a grammar property, which refers to one of the grammars defined within the tags or within the root <txml> tag. Character data of the <fill> tag is preferably displayed before the user fills in the blank.

A <grammar> tag defines a grammar that can be used within the above fill tags to receive voice input. Grammars should have their language specified by the lang property. If omitted, the same grammar is used across all languages (useful for example for lists of names). When using Java, the grammar tag should contain either a Java Speech Grammar Format (jsgf) property, which contains the right side of a jsgf grammar rule, or a file property, specifying a full jsgf grammar. Files referenced by <grammar> tags should be stored in a specified directory, such as a "gram" directory. Grammars should also specify a hint property. Hints are displayed to inform users about available options that can be understood by the active grammar. It is to be understood that the invention is not limited to Java and that any appropriate language can be used. By way of example and not limitation, XML grammars could also be used.

Preferably, a multi-modal messaging application according to the present invention provides various features, including, but not limited to, support for multiple languages, automatic translation of messages to addressee's language, the ability to store and resend unsent messages, support for sending pictures, and a visual setup mechanism, referred to herein, by way of example, as "setup.vxml" that enables quick changes in settings, including language switching.

In the setup process, the user can choose only currently supported languages of a multi-modal browser, which prevents unwanted setting of languages for which the multi-modal browser has no resources.

Preferably, a user can customize the user settings of the messaging application by directly or indirectly modifying a configuration file referred to herein, by way of example, as "sms.ini". In particular, the configuration file "sms.ini" may be modified to customize the application's behavior by running the "setup.vxml" as noted above. Furthermore, settings can be altered also by directly editing the "sms.ini" file, which preferably comprises, by way of example, the following properties:

XML_FILE=filename
This setting specifies the name of the XML file containing templates of messages.
PEOPLE_FILE=filename
This setting specifies the name of the XML file containing directory of people.
SOUNDS=0-1
This setting switches all sounds off (0) or on (1).
LISTEN_DEPTH=n
This setting specifies the number (n) of child menu levels to listen for. For example, assume there is a category 'meeting', with a child category 'arrange', and a template with the keyword 'polite'. If LISTEN_DEPTH is set to 1, system will understand only 'meeting'. If LISTEN-DEPTH is set to 3, the user can say 'meeting arrange polite', which takes the user to the template right away.
FAST=0-1
FAST can be set to 1 if the user wants the system to show an addressee page immediately after filling all fields in a template. If FAST is set to 0, system waits until the user presses or says either 'ok' or 'edit'.
SENTENCE_LISTEN=0-1
SENTENCE_LISTEN can be set to 1 if the user wants to say the whole message right away. For example say 'Sorry, I will be 20 minutes late' either from the top menu or from the late menu, and the system will show the addressee page.
SAMPLE_LENGTH=n
This setting specifies the maximum number (n) of characters displayed for each template in the list of templates offered to the user.
SMTP_SERVER=a.b.c.d
This setting specifies the IP address of an SMTP outgoing mail server that will be used for sending sms or mail messages, for example.
QUEUE_MESSAGES=0-1
If set to 1, messages that were not sent successfully are stored and sent later automatically.
SMILES=0-1
If set to 1, a smilie is displayed next to each template that allows adding pictures to it.
LANG=en-gr|
This setting enables the user to choose the language of communication with the sms application and the corresponding set of templates.
TRANSLATE=0-1
If set to 1, messages are translated to the addressee's language.
OPERATORS=eurotel:0042<n>@sms.eurotel.cz,paegas:+42<n>(sms.paegas.cz, oskar:+42<n>@sms.oskarmobil.cz
This setting specifies a list of operators and their messages-by-mail server addresses in the above format for all mobile operators used by the contacts of the user.

More specifically, the OPERATORs parameter defines known mobile operators and corresponding e-mail addresses that can be used for sending instant messages via e-mail. For example, operator EUROTEL offers sending instant messages by e-mail in the form "+042<mobile_phone_number>@sms.eurotel.cz". To support different mobile operators, the parameter can be set according to the following format:

name_of_operator: prefix <N>@ server where <N> marks the place where phone numbers will be inserted. All entries (one for each operator) should form one line and should be separated by commas. These operator names can be used for the contacts in the user's addressbook.

It is to be appreciated that a multi-modal messaging application according to the invention can be localized by the user by performing various steps. As noted above, the user can set the default language by running, e.g., "setup.vxml" and setting the language property to the user's language abbreviation.

The user can create a set of new <category> tags with their lang properties set to the selected language abbreviation. As noted above, for the translation process to work, the same categories in different languages should have identical values of their id attributes. For example, the english category <category id="meeting" lang="en" name="meeting" icon=" . . . "> is considered to be the same as its german version <category id="meeting" lang="gr" name="Treffen" icon=" . . . ">. The user can create his/her own templates within these categories. The messages will be correctly translated if the same order of templates is maintained within the user's categories as in categories of different languages. Within the <sms> tag, the user can supply grammars to be used by user-defined templates in his/her language. The lang property of these grammars should be set to the user's selected language. Any file grammars (grammars, that refer to an external grammar file, for example number.jsgf or time.jsgf) have to be supplied in the user's language as well. Grammars are automatically translated according to their names and word positions. When the user supplies a new grammar, its name should be the same as the names of the different language versions. The user should keep the word order.

Preferably, there are several special grammars that exist for each language and their names are 'application' and 'images'. The jsgf property of the 'application' grammar contains words used to navigate through the application. The 'images' grammar is a file grammar and its file should contain keywords identifying pictures that can be added to messages. The user should translate both grammars and in case of the 'application' grammar, the user should keep the order of words.

As noted above, omitting the lang attribute of a category indicates that the category contains subcategories of different languages. The name of such category is then shared among all different languages. If the user does not want to use the same category name in all languages, the user can write multiple categories with their languages specified, which will then contain subcategories only of the language specified by their superior category. Furthermore, omitting the lang attribute of a grammar indicates that the grammar is shared among all different languages and needs no translation. This is useful, for example, for names of friends that do not change when the language is switched.

Figure 3:
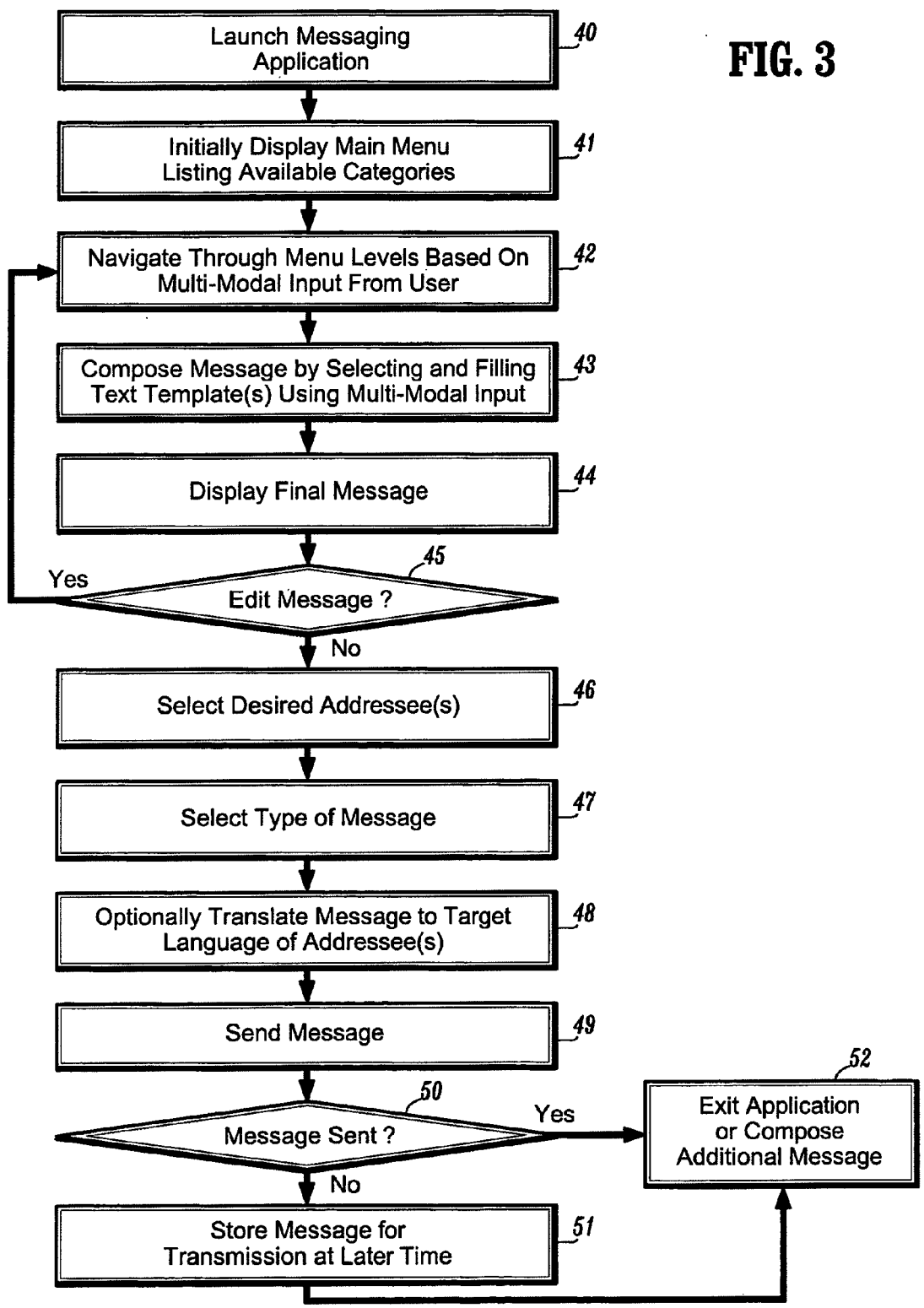
FIG. 3 is a flow diagram illustrating a method for composing a message according to one aspect of the invention.

Referring now to FIG. 3, a flow diagram illustrates a method for composing a message according to an exemplary embodiment of the invention. Initially, the user will launch the messaging application (step 40). In one embodiment, the messaging application can be launched by selecting a specified file (e.g., "sms. vxml") from a menu of the browser. Once loaded, the messaging application will initially display the main page (or main menu) which displays a list of the predefined (and user defined) categories (step 41). For instance, FIG. 1 illustrates device (11) displaying a list of categories such as those set forth in Table 1. The main menu of the application lists the available categories, and each category in turn, contains sub-menus that include either next categories (subcategories) or/and keywords associated with text templates.

While in the main menu, the user can begin navigating through the various menus of the application by selecting menus and menu items via multi-modal input (step 42). For instance, the user can navigate through the application by manually selecting menu items (e.g., pressing the up/down buttons (18, 19) of device (11)) or by uttering the names of the menu items, to thereby move through the various levels of menus. The user can sequentially recite various names of menu items one at a time, which allows the user to move through various menu levels one at a time. Alternatively, the user can utter various names at once to immediately skip a few menu levels. By way of example, referring to the templates in Table 1 above, instead of manually selecting or uttering "meeting" (category), then "arrange" (sub-category), and then "polite" (keyword), the user can utter "meeting arrange polite" right away, which brings the user to the associated template much faster.

While the user is in the main menu, the application will "listen" for all available sentences. While the user is in a menu of a given category (e.g., late), the application will "listen" only for messages associated with the category. For example, referring to the templates of Table 1, while in the main menu, the user can utter "Sorry I will be 2 minutes late", and the application will automatically compose the text message. However, if the user is in the "invite" category, for example, such message cannot be automatically generated by such utterance.

Preferably, the user can return to a higher menu level (previous page) of the application anytime by uttering 'back' or the user can return to the main menu by uttering "home" to go to the top level menu. Further, the user can exit the messaging application by choosing "exit" from the browser's menu, for example.

Figure 4:
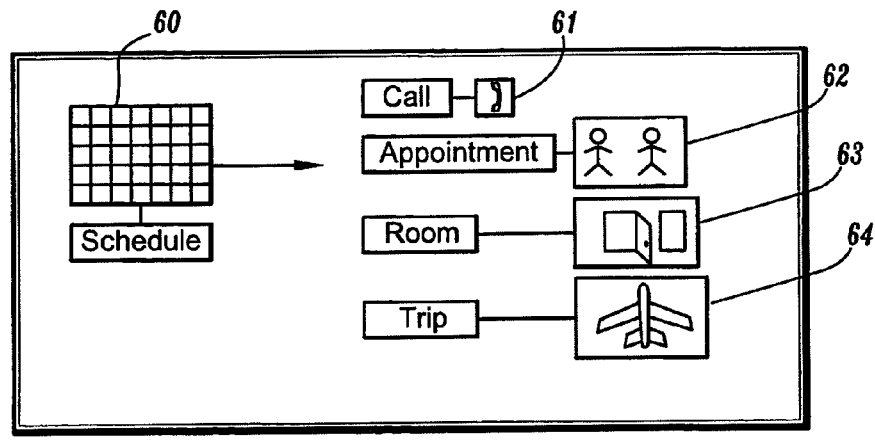
FIG. 4 is an exemplary diagram illustrating a graphical user interface (GUI) representation of a message template according to an embodiment of the present invention.

The user can compose a message by selecting and filling one or more text templates using multi-modal input (step 43). Preferably, when filling a template, at least one field is always maintained active (i.e., the application listens for user speech). A description of what the user can say is preferably displayed adjacent (e.g., below or next to) the message in a delimited area, such as a box, preferably a gray box. After a field is filled, the next field can become active. This feature is shown by way of example with reference to FIG. 4, which illustrates a GUI representation of a message template according to an exemplary embodiment of the invention. FIG. 4 depicts a schedule icon (60) in the form of a calendar grid with the word "schedule" below, and the next level of selectable menu items are displayed to the right, each with an icon and text. These items include a call (61) symbolized by a telephone handset, an appointment (62) symbolized by interacting stick figures, a room (63) symbolized by a wall with an open door, and a trip (64) symbolized by an airplane.

Figure 5:
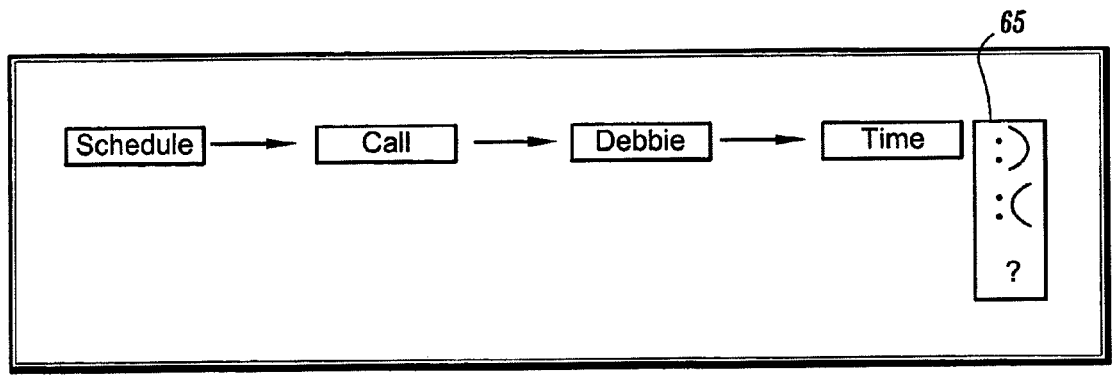
FIG. 5 is an exemplary diagram illustrating a GUI representation of a message template comprising icons according to an embodiment of the invention.

The user can optionally add pictures (e.g., MMS) to a message, which can be viewed by mobile phones that support picture viewing. By way of example, the user can add pictures by clicking an icon (for example, a "smiling icon") at the end of the template's text. FIG. 5 depicts a message that is composed to "schedule" a "call" with "Debbie" at a certain time, wherein pictures can be added, for example, by clicking on the a "smilie" icon, for example, in an icon bar (65).

Referring again to FIG. 3, after a message is composed, the message is preferably displayed for user verification (step 44). The user has the option to edit the message (step 45). Once the message is finalized, the user can send the message to a desired addressee in a desired form. For instance, the user can select a desired addressee or addressees (step 46) by uttering the name(s) of the addressee(s). Further, the user can select the type of message to send (e.g., SMS or an e-mail message) (step 47) by either manual selection or by uttering "mobile" or "mail", for example.

Figure 6:
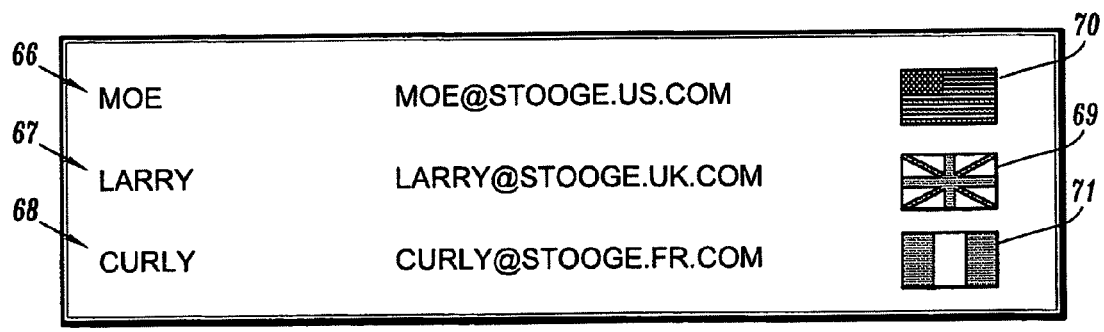
FIG. 6 is an exemplary diagram illustrating a GUI representation of an address book that is configured for automatic language translation according to an embodiment of the present invention.

Optionally, the user can have the message translated to a different language (step 48). Such translation can be automatically performed, for example, based on the addressee's language, which can be indicated, for example, by a flag shown next to the person's name in an address book (e.g., "people.csv"), wherein an addressee's language can be changed in such address book. As noted above, for the translation to work properly, templates for both the source and target languages should be specified in the template file. These templates should have identical positions within their <category> tags and they should use grammars of identical names. FIG. 6 illustrates an exemplary address book with entries for fictitious subjects Moe (66), Larry (67) and Curly (68). A fictitious e-mail address is shown for each and it is to be understood that any appropriate type of address data can be included. Subject Moe (66) is specified as being an American English speaker by virtue of the American Flag (70), while subject Larry (67) is specified as being a British English speaker by virtue of Union Jack flag (69). Finally, subject Curly (68) is specified a French speaker as symbolized by French tricolor flag (71). It is to be appreciated that other means of specifying language may be considered.

It is to be further appreciated that translation can occur between different languages, e.g., English and French, or between different dialects of the same language, for example US and British English. Assuming that the user of the system composes a message in US English, no translation would be performed when Moe is selected as a recipient. However, if Curly was selected as a recipient of the message, the message would be automatically translated to French. If Larry was selected as the recipient, US English could be modified to British English—e.g., "vacation" could be rendered as "holiday"; "parking lot" as "car park," and the like.

After the addressees, message type and language is selected, the application will send the message using the appropriate communications protocol (step 49). If the application fails to send the message (negative result in step 50) (for example due to a broken Internet connection), the message can be stored and sent at a later time (step 51). For instance, the messaging application can be configured so as to attempt to send unsent messages during startup or immediately after a new message has been successfully sent. The user can then exit the application or continue to compose additional messages (step 52).

In summary, message template (e.g., SMS voice templates) according to the present invention advantageously make the task of writing messages (e.g., SMS) much simpler and faster than conventional methods. For example, SMS voice templates according to an embodiment of the invention can reduce or completely eliminate the typing task. The templates can be edited by the user. When composing a message, desired templates can be readily selected by voice, rather than manually searching through complex menus. The combination of speech and GUI offers many different ways to reach the same goal, allowing the user to choose the most convenient way, users can edit templates and group them into categories, edit the final message, add new pictures, and the like. Overall, the task completion time for composing a SMS message, for example, using a multi-modal interface and templates according to the invention is an order of magnitude better that the traditional input via keyboard. A synergistic effect is achieved by combining multi-modality on small devices with wireless messaging.

It is to be appreciated that various systems and methods may be used for implementing a multi-modal user interface for a messaging application according to the invention. In preferred embodiments of the invention, methods and techniques for implementing a multi-modal browser or a synchronized multi-modal user interface are described, for example, in U.S. patent application Ser. No. 09/507,526, filed on Feb. 18, 2000, entitled: "Systems And Methods For Synchronizing Multi-Modal Interactions", U.S. patent application Ser. No. 09/544,823, filed on Apr. 6, 2000, entitled: "Methods and Systems For Multi-Modal Browsing and Implementation of A Conversational Markup Language", U.S. patent application Ser. No. 10/007,092, filed on Dec. 4, 2001, entitled "Systems and Methods For Implementing Modular DOM (Document Object Model)-Based Multi-Modal Browsers", and U.S. patent application Ser. No. 10/007,037, filed on Dec. 4, 2001, entitled "MVC (Model-View-Controller) Based Multi-Modal Authoring Tool and Development Environment", all of which are commonly assigned and incorporated herein by reference.

Figure 7:
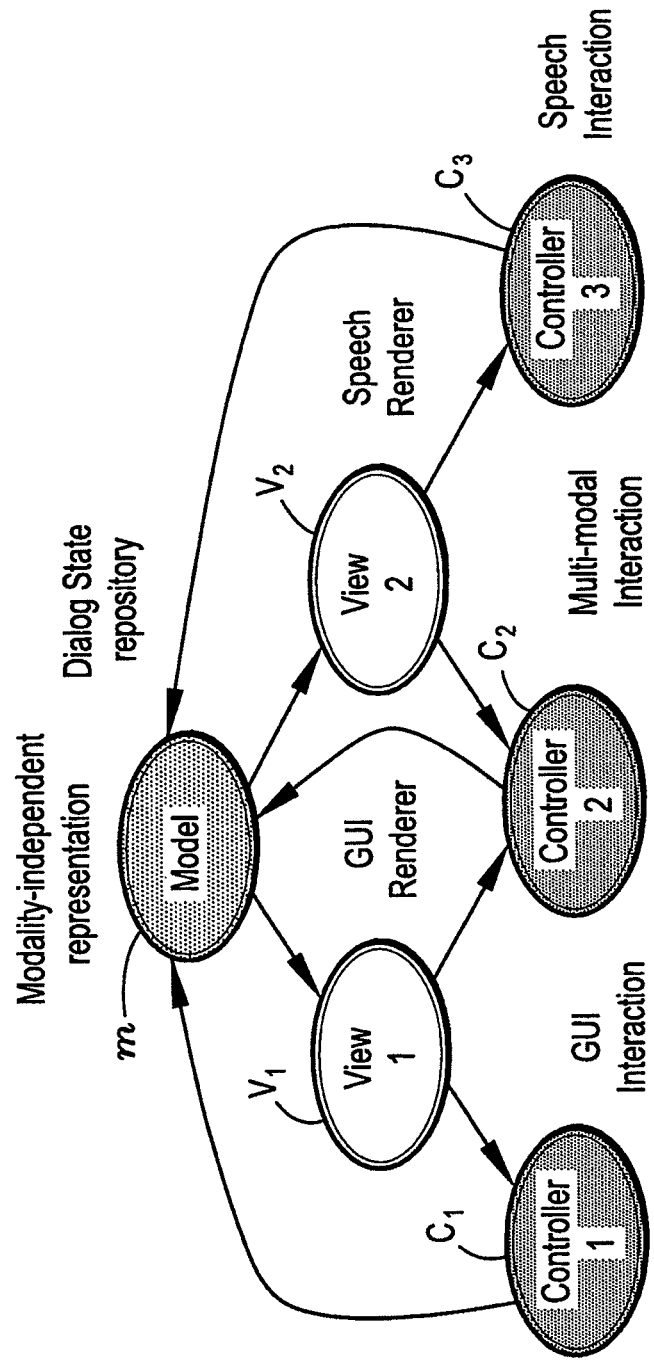
FIG. 7 is an diagram illustrating a framework of a synchronized multi-modal user interface that may be used in a messaging system according to the invention.

By way of example, FIG. 7 is a diagram illustrating a preferred programming paradigm for implementing a multi-modal browser (multi-modal user interface) in accordance with one embodiment of the present invention. A multi-modal application is preferably based on a MVC (model-view-controller) paradigm as illustrated in FIG. 7, wherein a single information source, model M (e.g., gesture-based IML model) is mapped to a plurality of views (V1, V2) (e.g., different synchronized channels) and manipulated via a plurality of controllers C1, C2 and C3 (e.g., different browsers such as a speech, GUI and multi-modal browser). With this architecture, multi-modal systems are implemented using a plurality of controllers C1, C2, and C3 that act on, transform and manipulate the same underlying model M to provide synchronized views V1, V2 (i.e., to transform the single model M to multiple synchronous views). The synchronization of the views is achieved by generating all views from, e.g., a single unified representation that is continuously updated. For example, a single authoring, modality-independent (channel-independent) IML model as described below provides the underpinnings for coordinating various views such as speech and GUI. Synchronization can be achieved, for example, using an abstract tree structure that is mapped to channel-specific presentation tree structures. The transformations provide a natural mapping among the various views. These transformations can be inverted to map specific portions of a given view to the underlying modes. In other words, any portion of any given view can be mapped back to the generating portion of the underlying modality-independent representation and, in turn, the portion can be mapped back to the corresponding view in a different modality by applying appropriate transformation rules.

It is to be appreciated that the systems and methods described herein can support programming models that are premised on the concept of "single-authoring" wherein content is expressed in a "user-interface" (or modality) neutral manner. More specifically, the present invention preferably supports "conversational" or "interaction-based" programming models that separate the application data content (tier 3) and business logic (tier 2) from the user interaction and data model that the user manipulates. An example of a single authoring, interaction-based programming paradigm that can be implemented herein is described in the above-incorporated U.S. patent application Ser. No. 09/544,823, "Methods and Systems For Multi-Modal Browsing and Implementation of A Conversational Markup Language".

In general, U.S. Ser. No. 09/544,823 describes a novel programming paradigm for an interaction-based CML (Conversational Markup Language) (alternatively referred to as IML (Interaction Markup Language)). One embodiment of IML preferably comprises a high-level XML (eXtensible Markup Language)-based script for representing interaction "dialogs" or "conversations" between user and machine, which is preferably implemented in a modality-independent, single authoring format using a plurality of "conversational gestures." The conversational gestures comprise elementary dialog components (interaction-based elements) that characterize the dialog interaction with the user. Each conversational gesture provides an abstract representation of a dialog independent from the characteristics and UI offered by the device or application that is responsible for rendering the presentation material. In other words, the conversational gestures are modality-independent building blocks that can be combined to represent any type of intent-based user interaction. A gesture-based IML, which encapsulates man-machine interaction in a modality-independent manner, allows an application to be written in a manner which is independent of the content/application logic and presentation.

Other applicable systems, methods and techniques that may be implemented herein to provide multi-modal interaction and provide application frameworks for multi-modal messaging are described, for example, in U.S. patent application Ser. No. 09/837,024, filed on Apr. 18, 2001, entitled "Systems and Methods For Providing Conversational Computing Via JavaServer Pages and Javabeans" and U.S. patent application Ser. No. 10/007,084, filed on Dec. 4, 2001, entitled "Reusable VoiceXML Dialog Components, Subdialogs and Beans", which are commonly assigned and incorporated herein by reference.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for authoring and using message templates on a mobile device of a mobile messaging system, the mobile device maintaining a user-specified name for a category associated with two or more related message templates, wherein the user-specified name for the category includes a statement summarizing content of at least one message template associated with the category without including all of the content, the category being defined using the user-specified name for the category, wherein the category has a meaning and the two or more related message templates share the meaning and are in a same language, wherein a keyword is defined for each message template associated with the category, and wherein each keyword is a unique identifier for the associated message template to allow a messaging user to use the associated message template in a mobile message, and wherein one or more properties associated with the category is specified, said one or more properties including an identification property that is used for logically associating the category with a same category in a different language, the method comprising:

receiving, by the mobile device from the messaging user via a multi-modal user interface of the mobile device, a spoken input;

composing, by the mobile device, a mobile message based on the spoken input at least by selecting, based on the spoken input, one of the message templates, at least in part by recognizing a category and/or a keyword in the spoken input;

translating the mobile message if a language of an addressee is a different language; and sending the mobile message over a network to a remote addressee device of the mobile messaging system.

2. The method of claim 1, wherein the one or more properties comprise a language property that specifies a language of subcategories and templates associated with the category.

3. The method of claim 1, wherein the one or more properties comprise a name property which is used to represent the category visually on a display or which is used for recognizing spoken input.

4. The method of claim 1, the mobile device further maintaining character data that defines at least one of the two or more related message templates associated with the category.

5. The method of claim 4, the mobile device further maintaining one or more fill tags that enables a user to add character data to at least one of the two or more related template messages.

6. The method of claim 5, the mobile device further maintaining a grammar property for a fill tag, wherein the grammar property specifies a grammar that is used to add character data to the fill tag based on spoken input.

7. A non-transitory computer readable storage device that tangibly embodies a plurality of instructions that, when executed, perform a method for authoring and using message templates on a mobile device of a mobile messaging system, the mobile device maintaining a user-specified name for a category associated with two or more related message templates, wherein the user-specified name for the category includes a statement summarizing content of at least one message template associated with the category without including all of the content; the category being defined using the user-specified name for the category, wherein the category has a meaning and the two or more related message templates share the meaning and are in a same language; wherein a keyword is defined for each message template associated with the category, and wherein each keyword is a unique identifier for the associated message template to allow a messaging user to use the associated message template in a mobile message, wherein one or more properties associated with the category is specified, said one or more properties including an identification property that is used for logically associating the category with a same category in a different language, the method comprising:

receiving, by the mobile device from the messaging user via the multi-modal user interface of the mobile device, a spoken input;

composing, by the mobile device, a mobile message based on the spoken input at least by selecting, based on the spoken input, one of the message templates, at least in part by recognizing a category and/or a keyword in the spoken input;

translating the mobile message if a language of an addressee is a different language; and sending the mobile message over a network to a remote addressee device of the mobile messaging system.

8. The computer readable storage device of claim 7, wherein the one or more properties comprise a language property that specifies a language of subcategories and templates associated with the category.

9. The computer readable storage device of claim 7, wherein the one or more properties comprise a name property which is used to represent the category visually on a display or which is used for recognizing spoken input.

10. The computer readable storage device of claim 7, the mobile device further maintaining character data that defines at least one of the two or more message templates associated with the category.

11. The computer readable storage device of claim 10, the mobile device further maintaining one or more fill tags that enables a user to add character data to at least one of the two or more related message templates.

12. The computer readable storage device of claim 11, the mobile device further maintaining a grammar property for a fill tag, wherein the grammar property specifies a grammar that is used to add character data to the fill tag based on spoken input.

13. A mobile device of a mobile messaging system for authoring and using message templates on the mobile device, the mobile device maintaining a user-specified name for a category that is associated with two or more related message templates, wherein the user-specified name for the category includes a statement summarizing content of at least one message template associated with the category without including all of the content; the category being defined using the user-specified name for the category, wherein the category has a meaning and the two or more related message templates share the meaning and are in a same language, wherein a keyword is defined for each message template associated with the category, and wherein each keyword is a unique identifier for the associated message template to allow a messaging user to use the associated message template in a mobile message, and wherein one or more properties associated with the category is specified, said one or more properties including an identification property that is used for logically associating the category with a same category in a different language, the mobile device comprising:

a computing device;

a storage device comprising executable instructions stored therein, the instructions, when executed by the computing device, cause the computing device to:
- receive, the messaging user via a multi-modal user interface of the mobile device, a spoken input;
- compose a mobile message based on the spoken input at least by selecting, based on the spoken input, a one of the message templates, at least in part by recognizing a category and/or a keyword in the spoken input;
- translate the mobile message if a language of an addressee is a different language; and
- send the mobile message over a network to a remote addressee device of the mobile messaging system.

14. The mobile device of claim 13, wherein the one or more properties comprise a language property that specifies a language of subcategories and templates associated with the category.

15. The mobile device of claim 13, wherein the one or more properties comprise a name property which is used to represent the category visually on a display or which is used for recognizing spoken input.

16. The mobile device of claim 13, the mobile device further maintaining character data that defines at least one of the two or more related message templates associated with the category.

17. The mobile device of claim 16, the mobile device further maintaining character data by defining one or more fill tags that enables a user to add character data to at least one of the one or more message templates.

18. The mobile device of claim 17, the mobile device further maintaining a grammar property for a fill tag, wherein the grammar property specifies a grammar that is used to add character data to the fill tag based on spoken input.

* * * * *